United States Patent [19]
Tamada

[11] Patent Number: 5,880,711
[45] Date of Patent: Mar. 9, 1999

[54] THREE-DIMENSIONAL IMAGE DISPLAY METHOD AND ITS DISPLAY APPARATUS

[75] Inventor: Sakuya Tamada, Tokyo, Japan

[73] Assignee: Sony Corporation, Tokyo, Japan

[21] Appl. No.: 844,774

[22] Filed: Apr. 22, 1997

[30] Foreign Application Priority Data

Apr. 24, 1996 [JP] Japan .................................. 8-102839

[51] Int. Cl.$^6$ ...................................................... G09G 5/36
[52] U.S. Cl. ........................................................... 345/139
[58] Field of Search .................................. 345/139, 419; 359/23

[56] References Cited

U.S. PATENT DOCUMENTS

| | | | |
|---|---|---|---|
| 4,190,856 | 2/1980 | Ricks ....................................... | 350/171 |
| 4,487,490 | 12/1984 | McKee ..................................... | 354/115 |
| 5,237,351 | 8/1993 | Hayashi et al. .......................... | 354/199 |
| 5,363,163 | 11/1994 | Kohayakawa et al. .................. | 351/243 |
| 5,561,537 | 10/1996 | Aritake et al. ............................ | 359/23 |
| 5,589,980 | 12/1996 | Bass et al. ................................ | 359/478 |
| 5,689,316 | 11/1997 | Hattori et al. ............................ | 359/53 |
| 5,805,135 | 6/1994 | Suzuoki et al. .......................... | 345/139 |

OTHER PUBLICATIONS

Nagata, "Visual Sensitivities to Cues for Depth Perception," Journal of the Institute of Television Engineers of Japan, vol. 31, No. 8, p. 649, 1977.

*Primary Examiner*—Mark K. Zimmerman
*Assistant Examiner*—Ronald Laneau
*Attorney, Agent, or Firm*—Limbach & Limbach L.L.P.

[57] ABSTRACT

A display method of a three-dimensional picture image is provided which comprises a step for dividing and sampling a three-dimensional image space to be displayed into a plurality of two-dimensional images in a depth direction; a step for sequentially displaying each of the two-dimensional images; a step for observing each of the two-dimensional images by a naked eye through an optical system as a virtual image by the optical system; and a step for moving a position of the virtual image in an optical axis direction by changing an optical distance between the optical system and each of the two-dimensional images within an afterimage time of the naked eye, wherein each of the two-dimensional images is a two-dimensional image within the three-dimensional image space corresponding to each moving position of the virtual image and is set to be displayed at a time point of each moving position of the virtual image.

13 Claims, 6 Drawing Sheets

THREE-DIMENSIONAL IMAGE DISPLAY METHOD AND ITS DISPLAY APPARATUS

BACKGROUND OF THE INVENTION

1. Field of the Invention

The present invention relates to a three-dimensional image display method and its display apparatus for displaying a so-called solid picture image.

2. Related Background Art

FIG. 1 shows a schematic construction of one example of a conventional both-eyes type solid image display method. A left-hand projected image IL and a right-hand projected image IR having different polarizing directions on left-hand and right-hand sides are projected in consideration of the parallax of left-hand and right-hand naked eyes on a screen Sc. The above left-hand projected image IL and the above right-hand projected image IR are observed by a left-hand naked eye EL and a right-hand naked eye ER through a pair of polarizing glasses G having different polarizing directions on the left-hand and right-hand sides. In this case, an observer having the left-hand naked eye EL and the right-hand naked eye ER observes the projected images as a solid image by overlapping the left-hand projected image IL and the right-hand projected image IR.

In the example of FIG. 1, the observer observes the solid image by focusing his eyes on the optical images IL and IR projected onto the screen Sc. However, a convergence position of the two picture images IL and IR is a position Po located considerably before a position Ps of the screen Sc. Therefore, problems exist in that the observer greatly gets tired at an observing time and has a feeling of physical disorder.

Various kinds of systems for solving such fatigue problems are proposed as apparatuses capable of observing the projected images as a more excellent solid or three-dimensional image. For example, there is a display system in which a screen moved in a depth direction is arranged and a three-dimensional image is divided and sampled in this depth direction and the screen is moved in accordance with a divisional depth position of this picture image. In this case, the observer can observe the picture image on the screen as a three-dimensional image.

However, the display apparatus is particularly large-sized by moving the screen in this way when the three-dimensional picture image is widened on the screen. Further, no observer can observe this three-dimensional image as a deep three-dimensional image having an actual place feeling or presence. Accordingly, many problems are left in any of the apparatuses.

SUMMARY OF THE INVENTION

It is an object of the present invention to provide a three-dimensional image display method and its display apparatus simply constructed such that fatigue and a feeling of physical disorder are improved and a solid display can be observed in a deep range from a short distance to infinity with an excellent actual place feeling or presence.

According to a three-dimensional image display method of the present invention, a three-dimensional image space to be displayed is first divided and sampled into a plurality of two-dimensional images in a depth direction. Each of these two-dimensional images is sequentially displayed. Each of these displayed two-dimensional images is observed by a naked eye through an optical system as a virtual image by this optical system. A position of the virtual image is moved in an optical axis direction by changing an optical distance between the above optical system and each of the displayed two-dimensional images within an afterimage time of the naked eye. Each of the two-dimensional images divided in the depth direction of the three-dimensional image display space and corresponding to each moving position of the virtual image is displayed at a time point of each moving position. A three-dimensional image can be observed by the naked eye by overlapping and observing respective virtual images of these two-dimensional images.

A three-dimensional image display apparatus according to the present invention has a display mechanical unit comprising an image display panel capable of performing a high speed display; an optical system for observing a two-dimensional image displayed on the image display panel through a naked eye by a virtual image of this two-dimensional image; and an optical distance controller for changing an optical distance between the image display panel and the optical system by electric control.

The three-dimensional image display space for a display purpose is divided and sampled to a plurality of two-dimensional images in a depth direction. An optical distance between the image display panel and the optical system is changed by the optical distance controller within an afterimage time of the naked eye. The above two-dimensional images are sequentially displayed on the image display panel. The positions of virtual images of these displayed two-dimensional images are moved in the optical axis direction. Each of the two-dimensional images divided in the depth direction of the three-dimensional image display space and corresponding to each moving position is sequentially displayed at a time point of each moving position. A three-dimensional image is observed by the naked eye by overlapping and observing the respective virtual images of these two-dimensional images.

In accordance with the above three-dimensional image display method and its display apparatus of the present invention, a three-dimensional image of this display apparatus is observed by observing an image (virtual image) by the optical system without observing any image on the screen so that it is possible to avoid a large-sized structure of the display apparatus using an arrangement of the screen.

Since the solid image is observed by an observer by moving the image, i.e., the virtual image formed by the optical system, a deep solid image having an actual place feeling is observed by slightly moving the optical distance. In the present invention, when the solid image is observed by both eyes, convergence and adjusting positions agree with a position of each two-dimensional image display face, i.e., the reproduced solid image so that a fatigue feeling and a feeling of physical disorder can be effectively reduced.

DETAILED DESCRIPTION OF THE PREFERRED EMBODIMENTS

A three-dimensional image display method and its display apparatus according to the present invention will next be explained.

Figure 1:
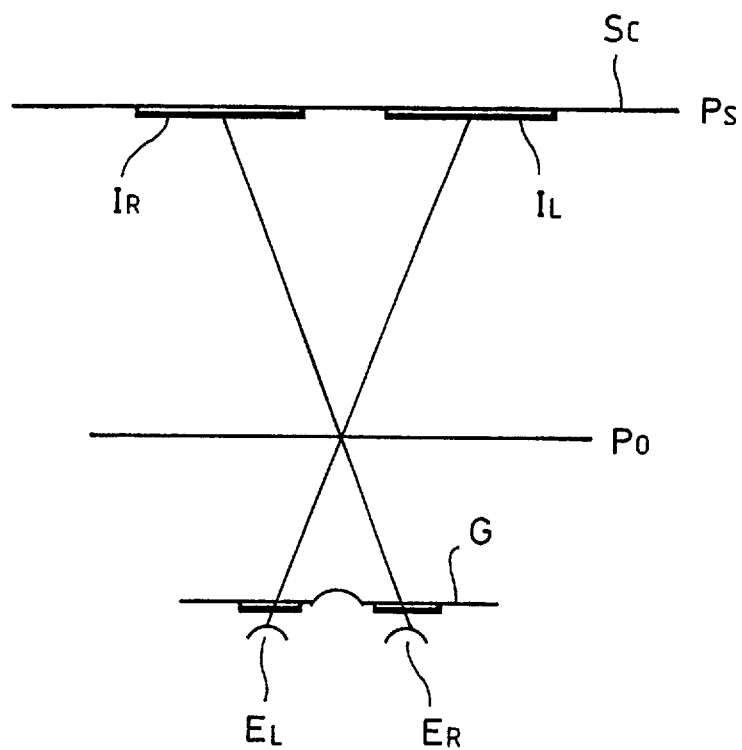
FIG. 1 is a schematic constructional view of one example of a conventional solid observing apparatus.
Figure 2:
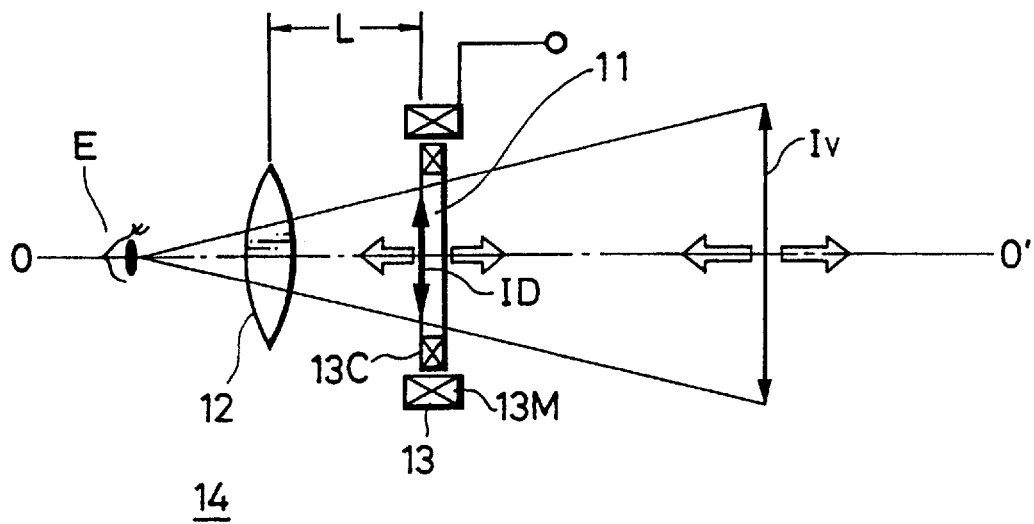
FIG. 2 is a constructional view showing an example of the three-dimensional image display apparatus according to the present invention.
Figure 3:
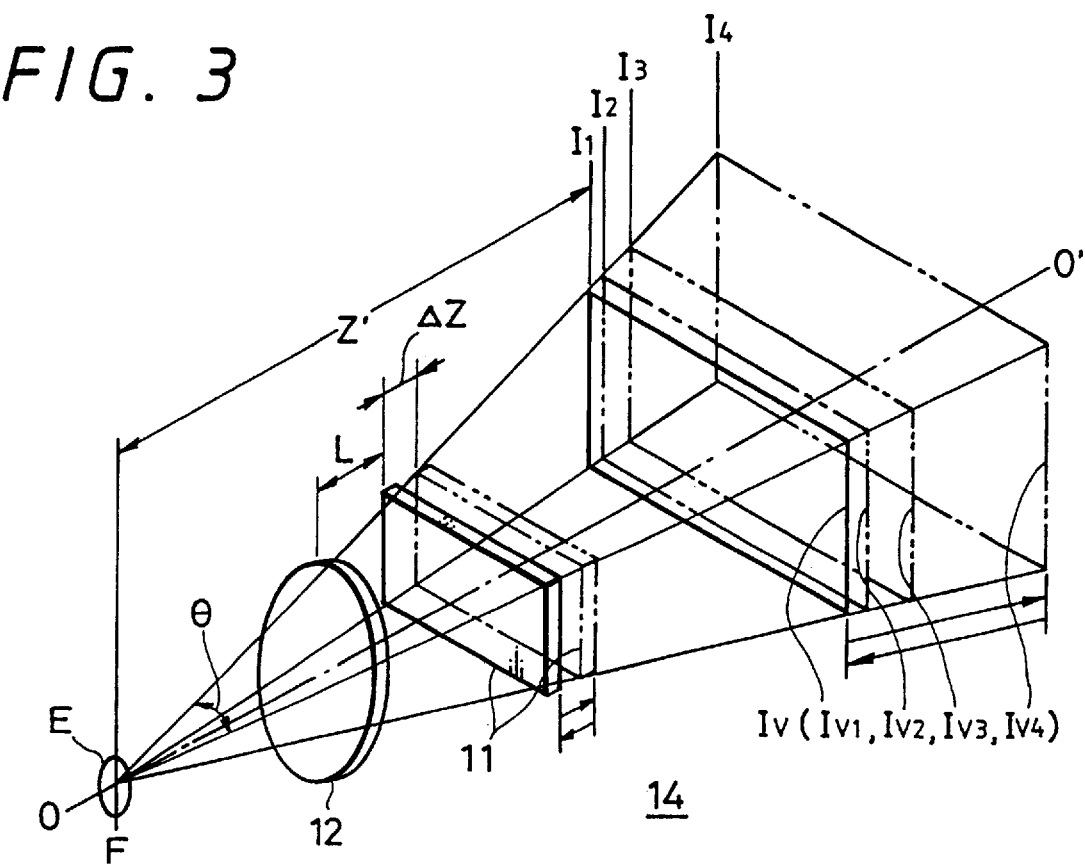
FIG. 3 is a solid optical view of the three-dimensional image display apparatus according to the present invention.

FIG. 2 shows a basic constructional view of the display apparatus according to the present invention based on the display method of the present invention, and FIG. 3 shows a solid optical view of this display apparatus. The present invention will next be explained with reference to FIGS. 2 and 3.

The display apparatus of the present invention has a display mechanical section 14 comprising an image display panel 11 such as a liquid crystal display panel capable of performing a high speed display, an optical system 12 such as an eyepiece using a convex lens or a concave mirror, and an optical distance controller 13. A two-dimensional image ID displayed on the image display panel 11 is observed by a naked eye E by its virtual image through the optical system 12. The optical distance controller 13 changes an optical distance L between the image display panel 11 and the optical system 12 (namely, the product of a spatial distance between the image display panel 11 and the optical system 12 and a refractive index in this space) by electric control.

For example, the controller 13 for controlling and changing the optical distance L by using an electric signal can be constructed by an electromagnetic actuator. For example, as shown in FIG. 2, a magnet or an electromagnetic coil, or a voice coil 13C is arranged in the liquid crystal display panel 11 capable of performing a high speed display. A magnet or an electromagnet 13M is arranged in a fixing portion located around an outer circumference of the voice coil 13C. The display panel 11 is moved in an optical axis direction (O–O') by flowing a predetermined control electric current through the voice coil 13c or the electromagnetic coil on a fixing side.

In the example shown in FIG. 2, the optical system 12 is constructed by a convex lens. The distance between the convex lens 12 and the naked eye E is selectively set to one focal length of the convex lens such that an optical image displayed on the image display panel 11 is observed as a virtual image Iv by the convex lens 12. In other words, the naked eye E is set to be located at one focal point F of the convex lens 12.

For example, a three-dimensional image display space for a display purpose is divided and sampled to a plurality of two-dimensional images within a constant visual field angle θ by a computer, for example, in a range from a near point position of the naked eye E such as a distance of distinct vision to an infinite distance with respect to a depth direction. These two-dimensional images are sequentially displayed on the image display panel 11. The distances between the divided and sampled images are set to distances proportional to n-th power of the visual distance in one portion of regions or all the regions of the display space in the depth direction (1.0<n<3.0).

It is generally said that the visual field angle able to be entirely confirmed by a human being is 30° in a horizontal direction. Therefore, for example, the visual field angle θ is selected to about 30° with respect to the horizontal direction, while with respect to the vertical direction, for example, the length of a side in the vertical direction/the length of a side in the horizontal direction is set to a ratio of ¾.

At this time, the distance L between the optical system 12 and the image display panel 11 is changed. In the example shown in FIGS. 2 and 3, the image display panel 11 is reciprocated in the optical axis direction O–O' by operating the optical distance controller 13, i.e., the above-mentioned actuator so that the distance L is changed.

For example, this optical distance L is changed by one directional movement, one reciprocating movement or plural reciprocating movements of the image display panel 11 within an afterimage time of the human eyes. A two-dimensional image divided and sampled in accordance with each moving position is displayed by this movement at each moving time point on the image display panel 11. The position of a virtual image Iv of the two-dimensional image is moved in the optical axis direction O–O' by changing the optical distance L. The virtual image Iv (Iv1, Iv2, Iv3, . . . ) is obtained in each of positions I1, I2, I3, . . . by projecting the two-dimensional image (as the above display object divided and sampled in the depth direction) corresponding to each of the moving positions onto the display panel 11.

Since this movement is selected within the afterimage time as mentioned above, plural virtual images of two-dimensional images divided in the depth direction are overlapped and observed within this afterimage time. In FIG. 3, the virtual images Iv1, Iv2, Iv3 and lv4 of four divided two-dimensional images are overlapped and observed within this afterimage time. These virtual images can be observed by synthesis as if these virtual images are a deep three-dimensional image.

Figure 4:
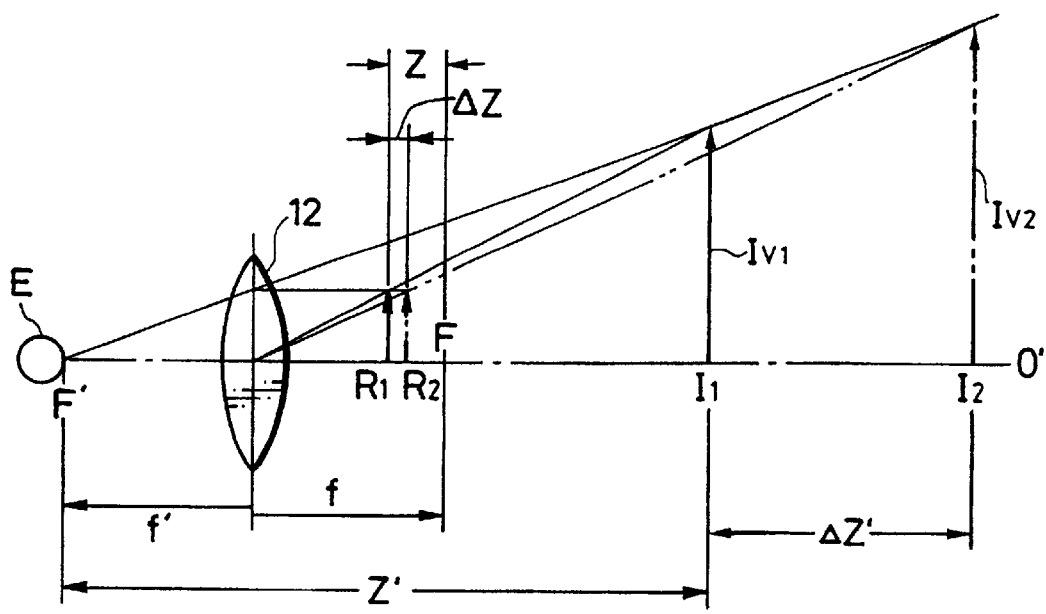
FIG. 4 is a diagram showing an optical path for explaining the principle of the present invention.

The relation between the change in this optical distance L and the moving amount of the virtual image will next be explained with reference to the two-dimensional optical view of FIG. 4 showing the construction of the present invention.

In this case, when the visual distance (a distance from the naked eye E, i.e., one focal point F of the convex lens of the optical system 12, to the virtual image Iv) is taken as Z', Z' is given by the following formula (1).

$$Z' = -f'^2/Z \quad (1)$$

Namely, the following formula (2) (Newton's formula) is provided when the optical system 12 is a thin convex lens and treats a paraxial ray and distances from the optical system 12 to both focal points F and F' of the lens, i.e., both focal lengths of the lens are respectively taken as f and f', and a distance from the focal point F to an object point is taken as Z, and a distance (hereafter called a visual distance) from the focal point F' to an image point is taken as Z'.

$$ZZ' = ff' = -f'^2 \quad (2)$$

(Here, f'=−f) Accordingly, the above formula (1) is obtained.

In the arrangement of the present invention, as mentioned above, when the naked eye E is located at the focal point F' of the lens 12 and its object point, i.e., an image on the display panel 11 in each of FIGS. 2 and 3 is located in a position R1, and a position of the image (object point) is slightly moved from this state to a position R2, a virtual image observed by the naked eye E at this time is moved from an image point I1 to an image point I2. When the object point is moved by a distance ΔZ, a moving amount ΔZ' of the image point is given by the following formula (3) from a differential calculation of the above formula (1).

$$\Delta Z' = (f^2/Z2) \cdot \Delta Z \quad (3)$$

When a moving speed of the display panel 11 is taken as v and the afterimage time of the naked eye is taken as Δt, formula (4) is derived.

$$\Delta Z' = (f^2/Z2) \cdot \Delta Z = (Z'2/f^2) \cdot v \Delta t \quad (4)$$

That is, when the display panel 11 is moved at a constant speed v in the above construction, the moving amount Δ Z' of the virtual image is proportional to the second power of the visual distance Z'.

Figure 5:
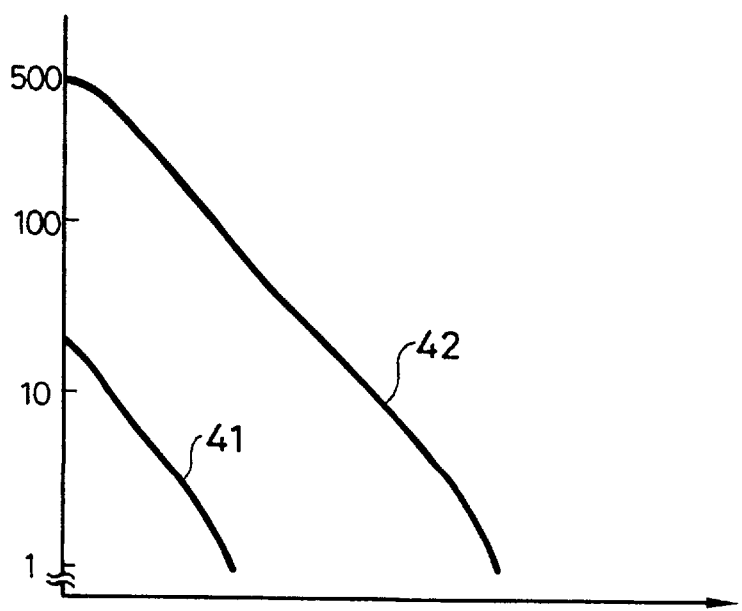
FIG. 5 is a graph showing the relation between a visual distance and a depth perception sensitivity of vision used to explain the present invention.

By the way, as shown in FIG. 5 (see FIG. 4, page 652, No. 8, Vol. 31, the journal of the institute of television engineers of Japan "Television", 1977), a depth perception sensitivity in the sense of vision of a human being is shown by a curve 41 in an adjusting or convergence case and is shown by a curve 42 in the case of a parallax of both eyes. Here, the visual distance is taken as D[m]. A depth discriminating threshold amount ΔD[m] of the curve 41 becomes ΔD ⊣D2/400[m] and a depth discriminating threshold amount ΔD[m] of the curve 41 becomes ΔD ⊣D2/20[m]. Specifically, the depth perception sensitivity is rapidly reduced in inverse proportion to the second power of the visual distance D as the visual distance D is increased.

That is, as mentioned above, the moving amount ΔZ' of the virtual image is changed in proportion to the second power of the visual distance, but the perception sensitivity is simultaneously reduced in proportion to the second power of the visual distance. Accordingly, the optical distance L is changed, namely, for example, the display panel 11 is moved by an equal velocity linear motion so that a three-dimensional image formed by the above plurality of two-dimensional images is observed without any unnatural feeling.

Accordingly, an actuator is simply designed in its moving control.

As mentioned above, sensitivity is reduced in the observation of a human being using naked eyes as the distance from the human being is increased. In sampling of two-dimensional images in a position far from a certain distance in the three-dimensional optical image, for example, it is sufficient to use only two-dimensional images at infinity by a sufficiently large distance.

The above two-dimensional images can be displayed on the display panel by a line sequence or a face sequence, etc.

Figure 6:
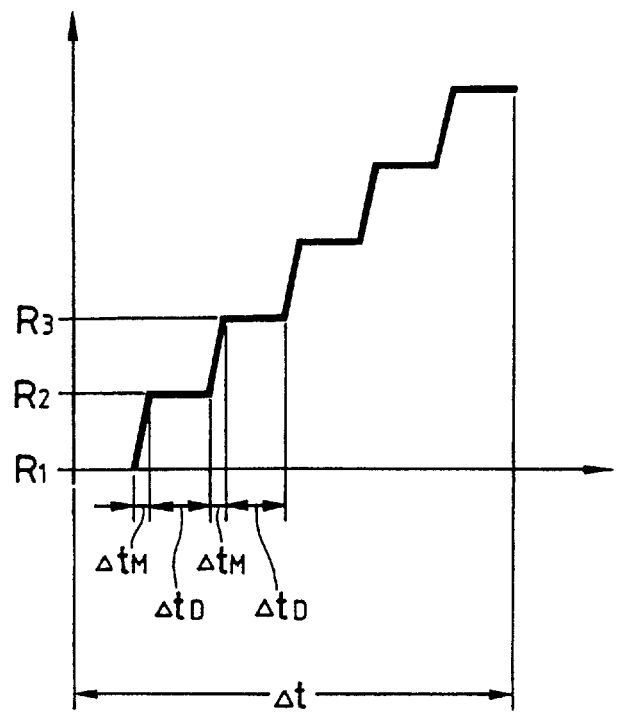
FIG. 6 is a diagram showing an example of a moving state of a display panel.

The change of the optical distance L, namely the movement of the display panel 11 in this construction is stepwise (intermittently) as positions R1, R2, R3, ... as shown in FIG. 6. Each of the divided and sampled two-dimensional optical images is displayed on the display panel 11 only at an interval ΔtD fixed to each of the positions R1, R2, R3 .... A moving interval ΔtM of the display panel 11 set by the actuator between the respective positions R1, R2, R3, ... can be set to a blanking period of each of the display images.

Figure 7:
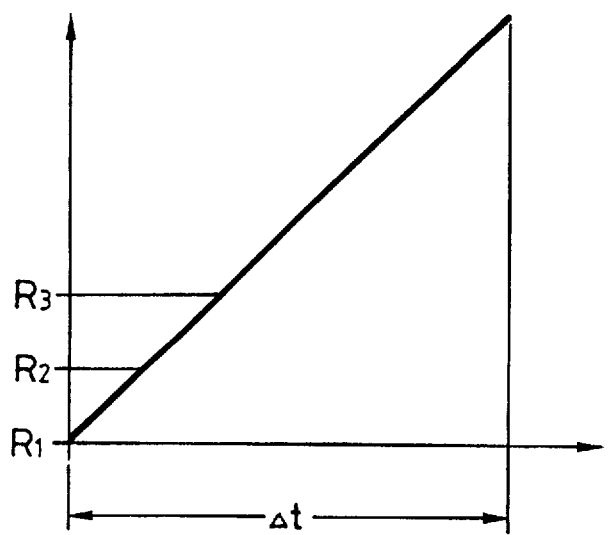
FIG. 7 is a diagram showing another example of the moving state of the display panel.

Otherwise, as shown in FIG. 7, the position of the display panel 11 can be set to be continuously changed. In this case, for example, when a two-dimensional image is sequentially displayed by a line sequence during a movement of the display panel, there is a fear of generation of distortion in the image. To avoid such a drawback, for example, it is desirable to simultaneously display the display image only for a short period of time on a high speed image display panel capable of entirely displaying one frame.

When the number of samples in depth, i.e., the number of displayed two-dimensional images is set to N and a total moving amount of the image display panel is set to P, each position Rn of the display panel shown in FIG. 4 is given by the following formula (5).

$$Rn = P(N-n)/N \quad (5)$$

(here, n=1, 2, 3, ... , N-1, N)

Here, a coordinate origin Rn=0 is set to the focal point F in FIG. 4. Accordingly, the position Zn' of a displayed virtual image face is provided by the following formula (6) using the above formula (1).

$$Zn' = f2/Rn \quad (6)$$

Figure 8:
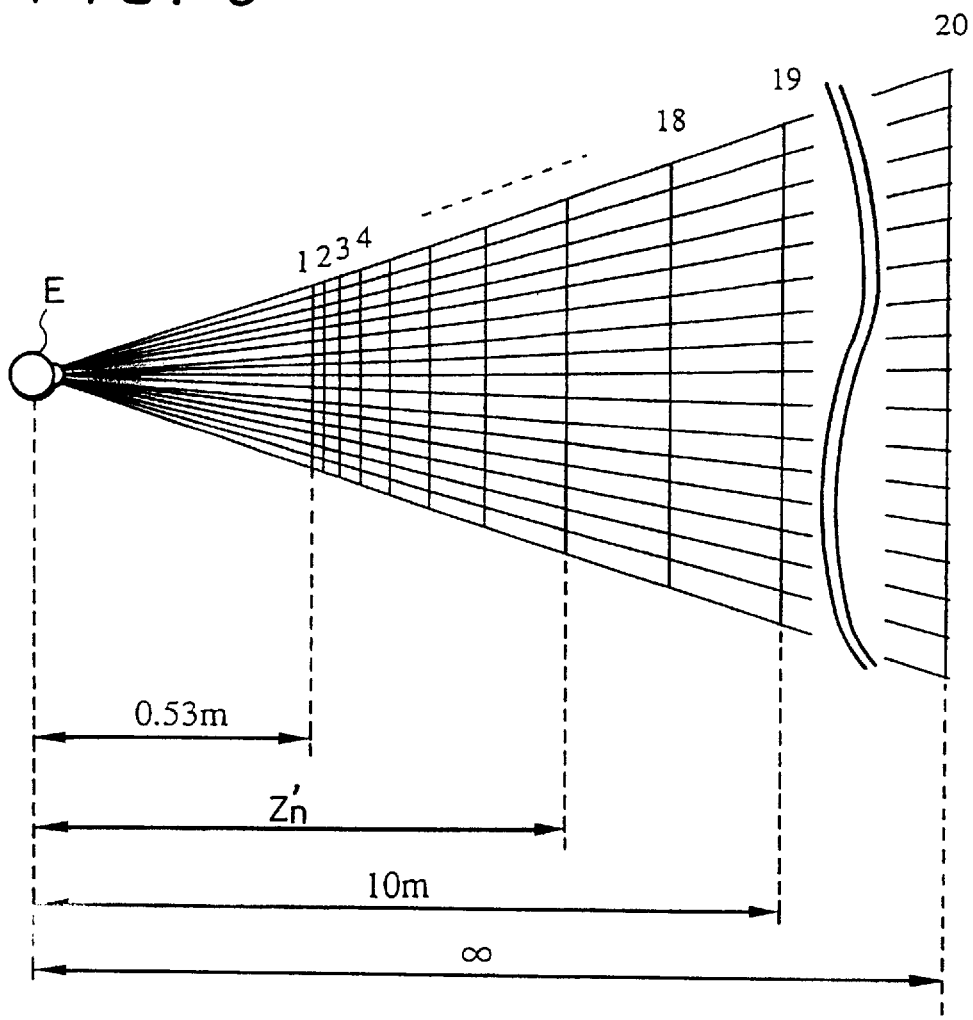
FIG. 8 is a diagram used for explaining a depth sampling example in the display apparatus of the present invention.

For example, when it is assumed that the focal length f of the optical system 12 is f=38.7 mm, P=3 mm and N=20 are set, respectively, Zn' is provided as shown in Table 1 and sampling in a reproduction region is provided as shown in FIG. 8.

TABLE 1

| No. | Zn' (m) |
| --- | --- |
| 1 | 0.53 |
| 2 | 0.56 |
| 3 | 0.59 |
| 4 | 0.63 |
| 5 | 0.67 |
| 6 | 0.71 |
| 7 | 0.77 |
| 8 | 0.83 |
| 9 | 0.91 |
| 10 | 1.00 |
| 11 | 1.11 |
| 12 | 1.25 |
| 13 | 1.43 |
| 14 | 1.67 |
| 15 | 2.00 |
| 16 | 2.50 |
| 17 | 3.33 |
| 18 | 5.00 |
| 19 | 10.00 |
| 20 | ∞ |

The reproduction region from n=1 to n=19 ranges from 0.53 m to 10 m. The distance between the positions of virtual image faces, i.e., a sampling distance is proportional to the second power of a visual distance. A reproduction region except for the above region is represented by a two-dimensional image of n=20 until infinity.

Figure 9:
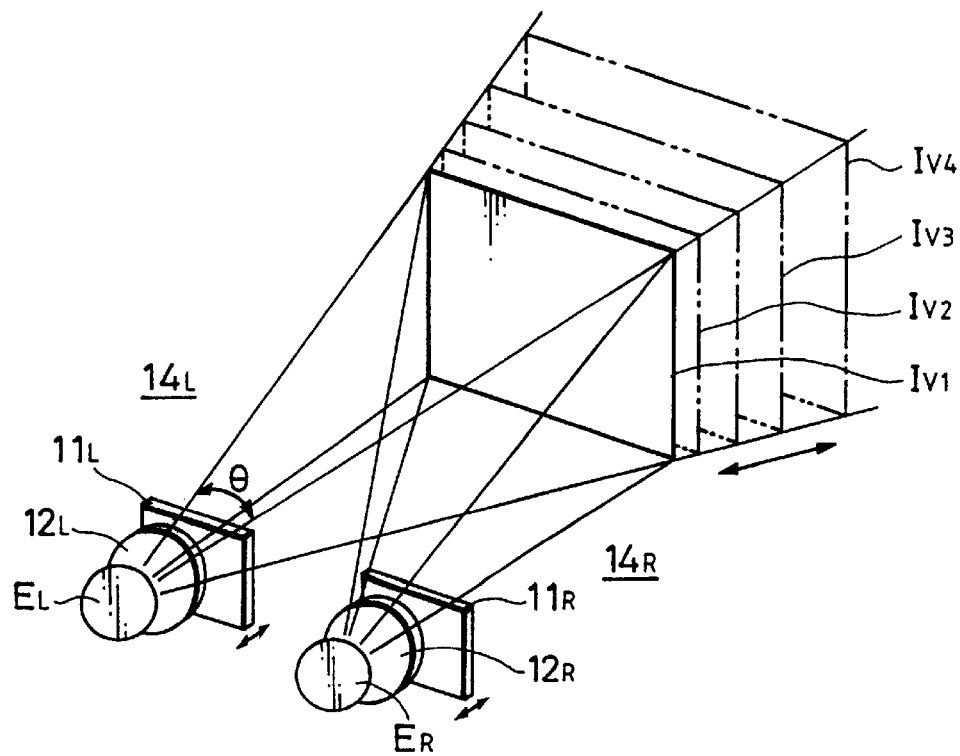
FIG. 9 is a constructional view of one example of a means for changing an optical distance in the display apparatus of the present invention.

When the curves 41 and 42 in FIG. 5 are compared with each other, the depth perception sensitivity provided by the parallax of both eyes is high about 20 times. It is desirable to observe a solid image with both eyes even in the display apparatus of the present invention. Accordingly, as shown in FIG. 9, it is possible to respectively correspondingly arrange display mechanical sections explained in FIGS. 2 and 3 with respect to the left-hand naked eye EL and the right-hand naked eye ER even in the display apparatus of the present invention. Indexes R and L are respectively added to reference numerals of respective portions in FIGS. 2 and 3 with respect to portions of the display mechanical sections of both the eyes in FIG. 9 each corresponding to the display mechanical section of each of FIGS. 2 and 3, and an overlapped explanation thereof is omitted. In accordance with this construction, an excellent three-dimensional image using a higher depth perception sensitivity can be observed.

Figure 10:
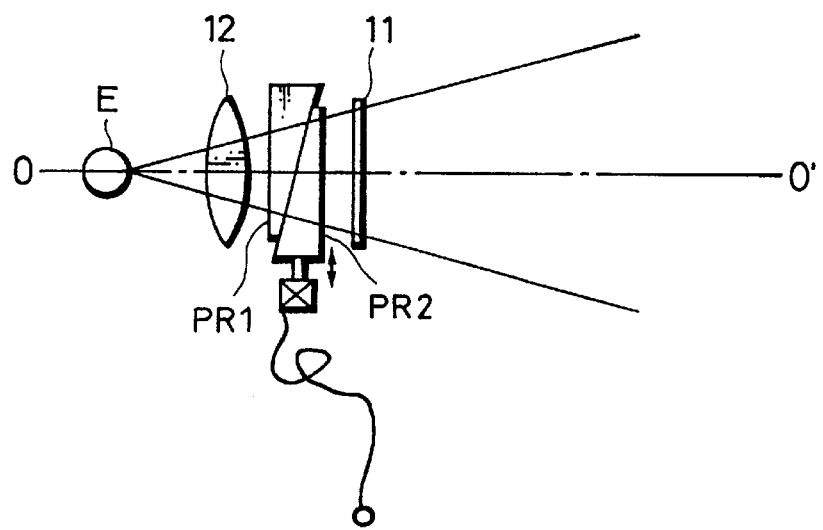
FIG. 10 is a constructional view of another example of the changing means of the optical distance in the display apparatus of the present invention.

In the above-mentioned example, the optical distance L is changed by moving the display panel 11 by the electromagnetic actuator. However, this change in the optical distance is not limited to the above construction. For example, as shown in FIG. 10, a pair of prisms PR1 and PR2 having predetermined refractive indexes can be overlapped and arranged between the optical system 12 and the display panel 11. In this case, for example, it is possible to use various kinds of constructions such as a structure for changing the optical distance by arranging an actuator for one prism PR2 and moving this prism PR2 so as to substantially change thicknesses of the prisms.

As mentioned above, in accordance with the display method and the display apparatus of the present invention, a solid image is observed by an observer by moving an image, i.e., a virtual image formed by an optical system. Accordingly, a deep solid image having an actual place feeling is observed by slightly moving the optical distance. In the present invention, when the solid image is observed by both eyes, convergence and adjusting positions agree with a position of each two-dimensional image display face, i.e., a reproduced solid image so that a fatigue feeling and a feeling of physical disorder can be effectively reduced.

As mentioned above, in accordance with a three-dimensional image display method and its display apparatus of the present invention, a three-dimensional image of this display apparatus is observed by observing an image (virtual image) by the optical system without observing any image on the screen so that it is possible to avoid a large-sized structure of the display apparatus using an arrangement of the screen.

Since the solid image is observed by the observer by moving the image, i.e., the virtual image formed by the optical system, a deep solid image having an actual place feeling is observed by slightly moving the optical distance. In the present invention, when the solid image is observed by both eyes, convergence and adjusting positions agree with a position of each two-dimensional image display face, i.e., the reproduced solid image so that a fatigue feeling and a feeling of physical disorder can be effectively reduced.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A display method of a three-dimensional picture image, comprising the steps of:

dividing and sampling a three-dimensional image space to be displayed into a plurality of two-dimensional images in a depth-wise direction;

sequentially displaying each of said two-dimensional images on a display panel;

observing each of said two-dimensional images on said display panel by a naked eye through an optical system as a virtual image; and moving a position of said virtual image and said display panel together in an optical axis direction by changing an optical distance between said optical system and each of said two-dimensional images on said moving display panel within an afterimage time of the naked eye, wherein each of said two-dimensional images is a two-dimensional image within said three-dimensional image space corresponding to each moving position of said virtual image and is set to be displayed at a time point of each moving position of the virtual image.

2. A three-dimensional image display apparatus having a display mechanical section, comprising:

an image display panel capable of performing a high speed display;

an optical system for observing a two-dimensional image displayed on said image display panel through a naked eye by a virtual image of this two-dimensional image; and an optical distance controller for changing an optical distance between said image display panel and said optical system by electric control, wherein said optical distance controller is arranged such that a position of the observed virtual image is changed by changing the optical distance between said image display panel and said optical system within an afterimage time of the naked eye, and a two-dimensional image corresponding to the position of said virtual image among a plurality of two-dimensional images obtained by dividing and sampling a three-dimensional image display space to the display in a depth direction is sequentially displayed on said display panel.

3. The three-dimensional image display apparatus as claimed in claim 2, wherein said display mechanical section is arranged in accordance with both eyes of an observer; and said displayed two-dimensional image is set to an image considering a parallax between said both eyes.

4. The three-dimensional image display apparatus as claimed in claim 2, wherein said optical distance is stepwise changed by said optical distance controller of said display mechanical section.

5. The three-dimensional image display apparatus as claimed in claim 2, wherein said optical distance is continuously changed by said optical distance controller of said display mechanical section.

6. The three-dimensional image display apparatus as claimed in claim 2, wherein said display mechanical section has a high speed image display panel capable of simultaneously displaying said sampled two-dimensional images together, said optical distance controller continuously changes said optical distance, and said high speed image display panel displays an image corresponding to the virtual image position at the optical distance only for a short period of time at a time point at each optical distance.

7. A display method of a three-dimensional picture image, comprising the steps of:

dividing and sampling a three-dimensional image space to be displayed into a plurality of two-dimensional images in a depth direction;

sequentially displaying each of said two-dimensional images;

observing each of said two-dimensional images by a naked eye through an optical system as a virtual image by this optical system; and moving a position of said virtual image in an optical axis direction by changing an optical distance between said optical system and each of said two-dimensional images within an afterimage time of the naked eye, wherein each of said two-dimensional images is a two-dimensional image within said three-dimensional image space corresponding to each moving position of said virtual image and is set to be displayed at a time point of each moving position of the virtual image, and wherein when the three-dimensional image display space to be displayed is divided and sampled to said two-dimensional images relative to the depth direction, a divisional sampling distance is set to a distance proportional to a n-th power (1.0<n<3.0, n is a real number) of a visual distance in one portion or all regions of the display space.

8. The three-dimensional image display method as claimed in claim 7, wherein said divisional sampling distance in the optical axis direction is set to a distance proportional to the second power of a visual distance in one portion or all regions of the display space.

9. A three-dimensional image display apparatus having a display mechanical section, comprising:

an image display panel capable of performing a high speed display;

an optical system for observing a two-dimensional image displayed on said image display panel through a naked eye by a virtual image of this two-dimensional image; and an optical distance controller for changing an optical distance between said image display panel and said optical system by electric control, wherein said optical distance controller is arranged such that a position of the observed virtual image is changed by changing the optical distance between said image display panel and said optical system within an afterimage time of the naked eye, and a two-dimensional image corresponding to the position of said virtual image among a plurality of two-dimensional images obtained by dividing and sampling a three-dimensional image display space to the display in a depth-wise direction is sequentially displayed on said display panel, and wherein when the three-dimensional image display space to be displayed is divided and sampled to said two-dimensional images relative to the depth direction, a divisional sampling distance is set to a distance proportional to an n-th power (1.0<n<3.0, n is a real number) of a visual distance in one portion or all regions of the display space.

10. The three-dimensional image display apparatus as claimed in claim 9, wherein said divisional sampling distance is set to a distance proportional to the second power of a visual distance in one portion or all regions of the display space.

11. The three-dimensional image display apparatus as claimed in claim 2, wherein said optical system is fixed and a focal position of said optical system is set to a position observed by the naked eye.

12. The three-dimensional image display apparatus as claimed in claim 2, wherein said optical distance controller changes the optical distance by moving the position of a two-dimensional display on its optical axis.

13. The three-dimensional image display apparatus as claimed in claim 2, wherein said optical distance controller has an optical part arranged between the naked eye and the display panel, and the optical distance is changed by changing a refractive index of said optical part.

* * * * *